Sheet 1, 2 Sheets.
S. D. Locke.
Grain Binder.
Nº 97,534. Patented Dec. 7, 1869.
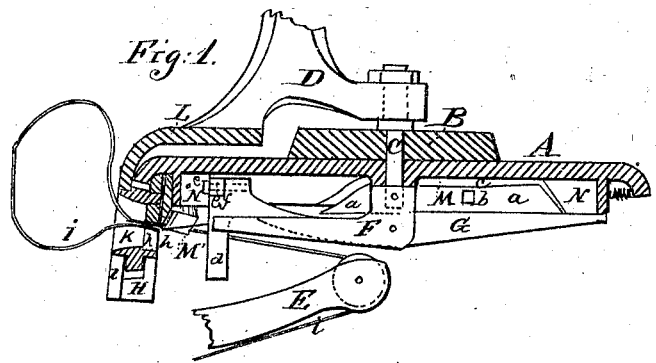
Fig. 1.
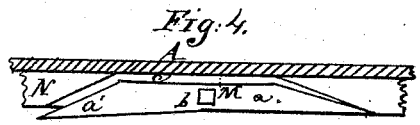
Fig. 4.
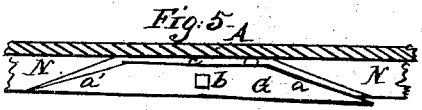
Fig. 5.
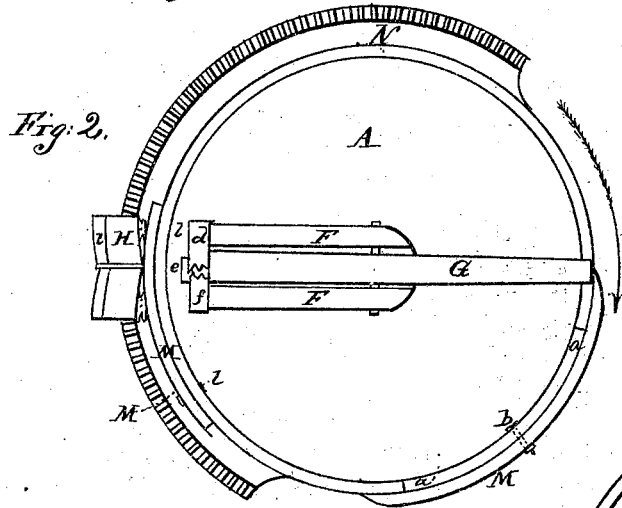
Fig. 2.
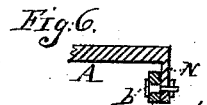
Fig. 6.
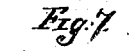
Fig. 7.
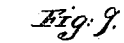
Fig. 9.
Fig. 8.
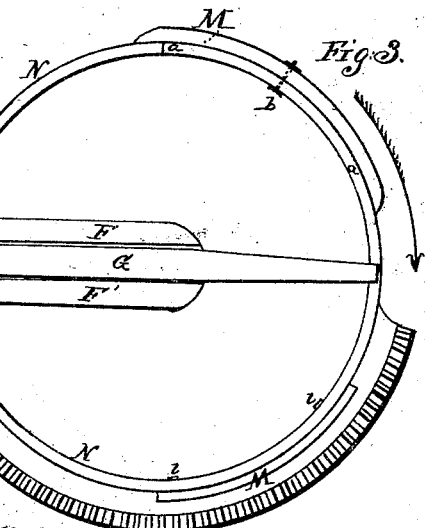
Fig. 3.
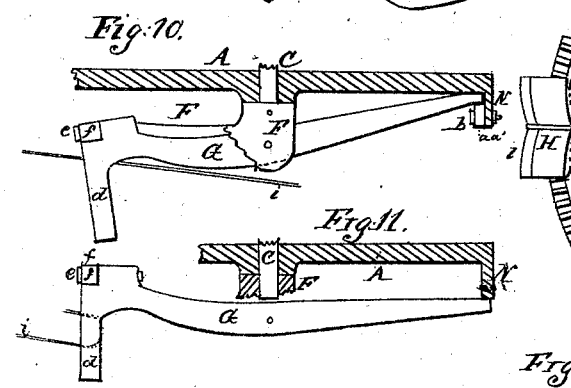
Fig. 10.
Fig. 11.
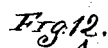
Fig. 12.
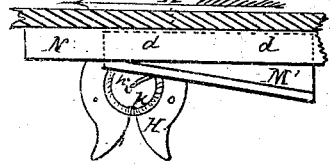
Witnesses:
S. A. Skinner
J. L. Lambish
Inventor:
Sylvanus D. Locke S.D. Locke.
Grain Binder.
No 97,534. Patented Dec. 7, 1869.
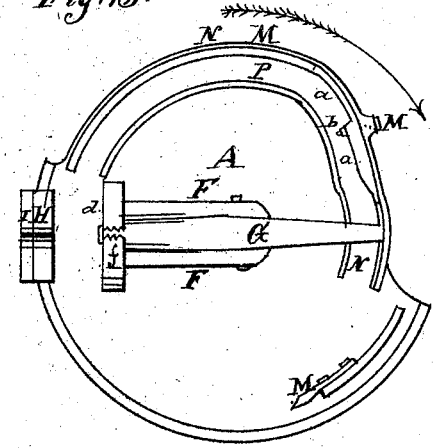
Fig. 13.
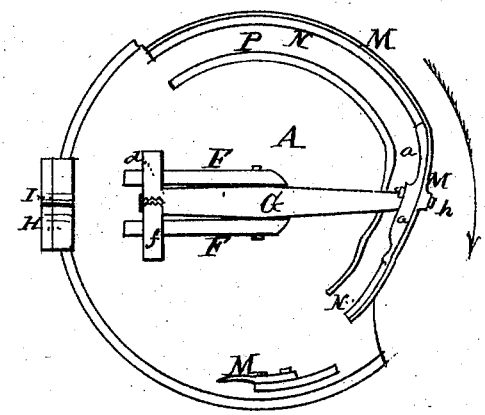
Fig. 14.
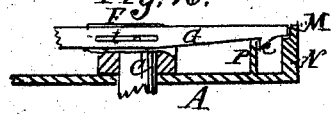
Fig. 16.
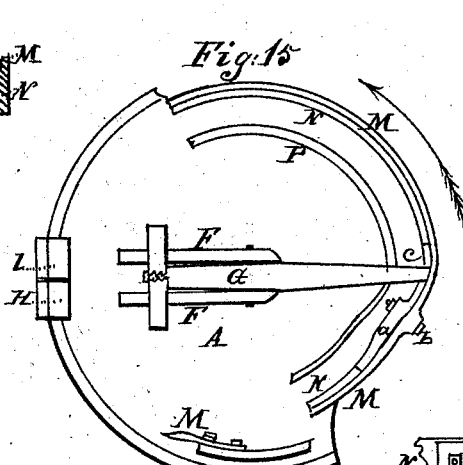
Fig. 15.
Fig. 17.
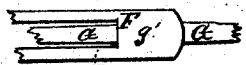
Fig. 19.
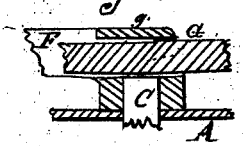
Fig. 20.
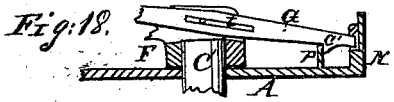
Fig. 18.
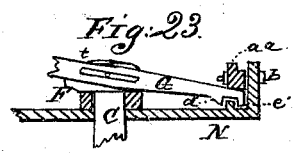
Fig. 21.
Fig. 23.
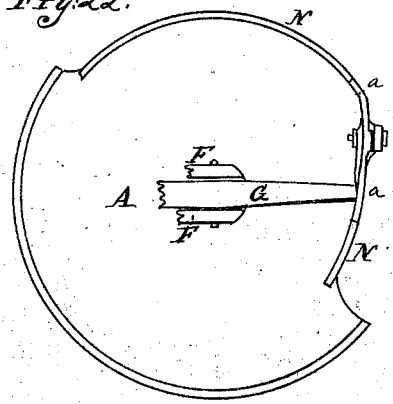
Fig. 22.
Witnesses:
S. A. Skinner
J. L. Lambert
Inventor:
Sylvanus D. Locke.

UNITED STATES PATENT OFFICE.

SYLVANUS D. LOCKE, OF JANESVILLE, WISCONSIN.

IMPROVEMENT IN GRAIN-BINDERS.

Specification forming part of Letters Patent No. 97,534, dated December 7, 1869.

CASE D.

*To all whom it may concern:*

Be it known that I, SYLVANUS D. LOCKE, of Janesville, in the county of Rock and State of Wisconsin, have invented certain new and useful Improvements in Grain-Binders; and I do hereby declare that the following is a full, clear, and exact description thereof, reference being had to the accompanying drawings, making a part of this specification, in which—

Figure 1 is a vertical section of the twisting and cutting mechanism, with a side view of the wire-holding device, and other accompanying parts. Figs. 2 and 3 are under-side views of the parts, as shown in Fig. 1. Figs. 4 and 5 are sections of the gear-wheel A, Fig. 1, showing the cam for operating the wire-holding device. Fig. 6 is a transverse vertical section of the parts shown in Figs. 4 and 5. Figs. 7 and 8 are end views of the wire-holding mechanism inverted. Fig. 9 is a top view of the same, as shown in Fig. 8. Figs. 10 and 11 are elevations of the wire-holding mechanism and sections of the gear-wheel and operating-cam. Fig. 12 is a rear view of the twisting and cutting mechanism shown in Fig. 1. Figs. 13, 14, and 15, Plate 2, are under-side views, showing a modification of the cams for operating the wire-holding device, so as to give a longitudinal reciprocating movement to the latter. Figs. 16, 17, and 18, Plate 2, are longitudinal vertical sections through the wire-holding device, of the parts shown in Figs. 13, 14, and 15, respectively. Fig. 19, Plate 2, is an under-side view of the wire-holding device, showing a modification of its support, and Fig. 20, Plate 2, is a section of the same. Fig. 21 shows a modification of the form of the cutting-knife. Fig. 22 is a side view of the cam and its connections, showing a modification of the mode of producing the longitudinal reciprocating movement of the wire-holder; and Fig. 23 is a longitudinal vertical section of the same.

The nature of my invention relates to the wire-cutting and wire-holding mechanism of a grain-binder; and consists in the employment, substantially as set forth, of the devices hereinafter more particularly described.

To enable others skilled in the art to make and use my invention, I will proceed to describe its construction and operation.

In the drawings, A represents a gear-wheel, to which is attached a pinion, B, both of which take bearing on a stud, C, in the arm D, or upon any other suitable support. E represents the head of the binding-arm, or arm for carrying the binding material around the bundle. Attached to the end of the stud C is a part, F F', to which is pivoted the handle G of the jaws $d\ f$ that hold the cut or free end of the wire. One of the jaws, as $d$, may be a part of the body or handle G, while the other, $f$, is pivoted to it, as shown, or both jaws may (like the jaw $f$) be pivoted to it. The pivoted jaw $f$ has a projecting portion or lug, $v$, that strikes against the leg F' as the jaws are raised, so opening them, as shown in Fig. 8. If both jaws are pivoted, then both may be provided with the projection $v$. The inner faces of the jaws $d\ f$ are cut longitudinally, with V-shaped grooves that, by crimping the wire, enable the jaws more easily to hold it. These faces may, however, be made plain.

One of the jaws may be provided with a tooth, $r$, Fig. 8, to aid in holding the wire.

The part F is divided, as shown, into two legs, F F', that stride the wire-holder G, and open or close the jaws $d\ f$, as the latter are, respectively, driven up or down by the cam-rim N and cam-latch $a\ a'$. The cam-latch $a\ a'$ is pivoted at $p$ on the support M, that, together with the cam-rim N, is attached to and should form a part of the gear-wheel A. K represents any revolving twisting device, as a slotted pinion, that takes bearing on any suitable support, as the parts H I L, attached to the arm D. The cam block or latch $a\ a'$ has the end $a'$ weighted, so as to cause the latch to assume the position shown in Figs. 1 and 4.

A spring may be employed instead of gravity to operate the cam-latch.

The knife M' for cutting the band is attached by the rivets $l$ or otherwise to the rim N of the gear-wheel A, and moves only when the latter moves. It may be of the form shown in Figs. 1 and 12—that is, with an inclined cutting-edge, as therein shown, or with a vertical, or nearly vertical, cutting-edge, as shown in Fig. 21.

The modification shown in Figs. 13, 14, and 15, is for the purpose of giving the wire-holder *d f* a reciprocating movement longitudinally or endwise. This movement is effected by making the cam N slightly irregular, as shown, (instead of its being described in the arc of a circle) and by adding to the gear-wheel A a second cam, P, Figs. 13, 14, 15, 16, 17, and 18, that is used to drive the wire-holder in one direction, as from the twisting device, as the gear-wheel revolves in one direction to twist the wire, while the raised portion or ledge M of the cam N drives it back as the gear-wheel revolves back after the twisting is done.

With this modification the pivot-orifice *t* is elongated, as shown in Figs. 16, 17, 18, and 23 to allow of the end movement of the wire-holder. Instead of the pivot-pin a cap, *b'*, Figs. 19 and 20, over the arm G of the wire-holder, retaining the latter in the part F F', may be used.

The cam P, working against the lug or pin *c'*, Figs. 16, 17, 18, and 23, drives the wire-holder G *d f* from the twisting device, while the raised portion M of the cam N, working against the end of the arm G, drives it back. By the use of a second lug or pin, *d'*, Fig. 23, outside of the cam N, in connection with the lug or pin *e'* in the inside thereof, the cam P and raised portion *m* may be dispensed with, as shown in Figs. 22 and 23.

When ready to operate, place the cut or free end of the wire in the jaws *d f*, or having kinked the end so as to prevent it from being drawn through the slot of the twisting-pinion K, place it in the latter, when the arm E opening to receive the bundle, and then closing again, loops the wire around it, as shown in Fig. 1, and lays it (the wire) again in the twisting-pinion, and within the inclined lips of the jaws *d f*, Figs. 1 and 7.

At this stage of the operation, the parts being in the position shown in Figs. 3, 7, and 11—that is, with the arm G on the cam N, and the jaws closed—the gear-wheel is made to revolve (either by a reciprocating rack working in the pinion B, or in any other desired manner) in the direction shown by the arrow in Figs. 3 and 13. The location of the cam-latch *a a'* is such that as soon as the twisting has fairly commenced, the end of the arm G, passing over the depending end *a'* of the cam-latch, is compelled to follow in the groove *c* between the latch and the cam N, so driving up the end of the arm G, and the wire-holder swinging on its pivot driving down the jaws *d f* to the position shown in Fig. 10, when the part *f'*, Figs. 7 and 8, of the pivoted jaw *f*, striking against the leg F', causes the jaws to open, so as to admit the wire *p*, as shown in Fig. 8. The wheel A, continuing to revolve in the same direction, soon carries the end of the arm G out of the cam-groove *c*, so swinging the wire-holder on its pivot, and driving up the jaws *d f* between the legs F F', by which they are closed, and the wire seized. The knife M' is so adjusted that immediately after the wire is seized by the jaws it drives its cutting-edge over the shearing-face of the twisting device, as shown in Figs. 1, 2, and 12, thereby severing the bundle, and allowing it to be thrown out or discharged from the machine, when the gear-wheel A revolves back, to its first position, (shown in Fig. 3,) the arm E again opens, and the operation is repeated, as before. As the wheel A revolves back, the arm G, owing to the end *a* of the cam-latch pressing against the cam N, as shown in Figs. 1 and 4, cannot enter the groove *c*, but passes over the cam, thereby not operating the wire-holder.

The operation of the wire-holder when the cam P, Figs. 13, 14, 15, 16, 17, and 18, ledge M, and lug *c'*, or when simply the lugs *d'* and *e'*, Fig. 23, are used, is evident from the previous description and the drawings, as the form of the cams P and N is such that, after the jaws are opened by the arm G entering the groove *c*, the wire-holder is taken back or away from the twisting device, as shown in Figs. 14, 15, 17, 18; and, after the jaws are closed and the bundle discharged, and while the wheel A is running back, the wire-holder is drawn forward to its first position. (Shown in Fig. 13.)

It will be observed that the method of securing and operating the knife M' removes the liability of its getting loose, and enables it more easily to be sharpened without removal than when pivoted, as heretofore, to the twisting-device.

It will also be observed that the jaws *d f* may be used to hold cord as well as wire.

What I claim is—

The combination of a rotating tying or twisting device, circular moving cutting mechanism, and reciprocating wire or cord holder, substantially as described.

SYLVANUS D. LOCKE.

Witnesses:
S. A. SKINNER,
J. L. LAMBERT.